Patented Sept. 3, 1935

2,013,091

UNITED STATES PATENT OFFICE 2,013,091

ORGANIC COLORING MATERIAL COMPRISING AN AZO COMPOUND AND A PETROLEUM SULPHONATE AS THE SUBSTRATUM

Archibald M. Erskine, Chatham, and Alfred Siegel, Hillside, N. J., assignors to Krebs Pigment & Color Corporation, Newark, N. J., a corporation of Delaware No Drawing. Application October 16, 1933, Serial No. 693,827

7 Claims. (Cl. 134—58.5)

Our invention comprises novel azo lakes and pigments in which the substratum is a petroleum sulphonate and processes of making the same.

Azo pigments are usually produced by converting more or less water soluble azo dyestuffs into their water insoluble alkaline earth or other insoluble metal salts and combining them with an inorganic substratum, such as alumina hydrate, blanc fixe, etc. Such substrata may also be added to insoluble azo dyestuffs which do not contain salt-forming groups. It is shown in U. S. Re. 18,590 that insoluble metallic rosinates can act as an organic substratum for azo pigments and that the lakes so obtained have outstanding advantages over lakes and pigments containing the usual mineral substrata.

We found that insoluble or colloidally dispersed metallic petroleum sulphonates are capable of acting as substrata for the formation of azo lakes and pigments and that we can obtain azo lakes and pigments of improved tinctorial properties which contain sulphonated petroleum compounds as a substratum.

Petroleum sulphonic acids, the salts of which are referred to herein, are obtained by the sulphonation of petroleum, generally the lubricating oil fractions, with sulphuric acid or with oleum, and consist largely of true sulphonic acids with relatively only small amounts of sulphuric esters. They are mono basic acids with a neturalization equivalent of about 500, some types, however, running as high as 700 or 900. Depending upon the character of the oil and the conditions of the sulphonation two types of sulphonic acids are obtained, an oil-soluble type (in the form of the free acids) referred to as "mahogany acids" and a water-soluble type referred to as "green acids", as described in U. S. Patent 1,474,933. The terms "oil-soluble" and "water-soluble" are to be understood as merely indicating preferential solubility. In both cases the alkali salts are water-soluble and the alkaline earth and heavy metal salts are relatively insoluble, or at least much less soluble than the alkali salts. The insoluble metalic petroleum sulphonates referred to below are derived from either the "oil-soluble" or "water-soluble" types of sulphonic acids or both.

Our process of producing our novel lakes and pigments containing a petroleum sulphonate as a substratum consists in developing by heating an aqueous suspension of an insoluble azo compound or salt in the presence of a substantially insoluble salt of a petroleum sulphonate. By the term development we refer to that step of the process of making lakes and pigments in which an insoluble azo compound is heated in aqueous suspension with a substratum. During this operation some physical and/or chemical changes take place, the azo compound combines with the substratum and the full tinctorial value of the pigment is obtained.

The suspension of the azo compound and the sulphonated petroleum compound can be obtained in any desired manner. We can, for instance, add a soluble alkali metal petroleum sulphonate to either the diazo compound or to the coupling compound, combine the two and then add an alkaline earth or heavy metal salt to the reaction mass whereby an aqueous suspension of an insoluble azo salt and an insoluble or colloidally dispersed petroleum sulphonate is produced which, on heating, develops our new lake. We can also separately prepare the azo compound, add the soluble petroleum sulphonate and jointly precipitate the corresponding insoluble salts and then develop the resulting aqueous suspension, or we can separately prepare the insoluble salt of the azo compound and the insoluble or coloidally dispersed petroleum sulphonate, mix the two into an aqueous suspension and heat this to effect development, or we can prepare an aqueous suspension of the two insoluble compounds in any other manner as will be obvious to those skilled in this art.

The insoluble petroleum sulphonates used in our novel lakes and pigments are produced by the action of alkaline earth and heavy metal salts upon the more or less soluble alkali metal salts of the sulphonates. Calcium, barium, aluminum, zinc, lead, etc. salts are preferred for this purpose. Similarly, when using salt-forming azo compounds we use their alkaline earth and heavy metal salts.

The development can be carried out in neutral or alkaline solution, similar results being obtained, though in many instances we prefer to develop in an alkaline medium. It is also in many instances preferred to add to the development mixture a dispersing agent such as a soap, a sulphonated vegetable or animal oil; among the commercially available products we found Turkey red oil, sulphonated castor oil, sulphonated cotton seed oil, sulphonated fish oil, etc. to be particularly available for this purpose.

Our invention is applicable to various azo dyestuffs of the following three types which are capable of being transformed into pigments.

*Mono-azo monosulphonic acids.*—The sulphonic acid group is usually and preferably located in the first, or diazo component. These toners are more or less soluble in the form of their free acids or alkali metal salts and are rendered insoluble by treatment with an alkaline earth or heavy metal salt. Instances of such combinations are the compounds formed by coupling 1. Diazotized 2-naphthylamine 1-sulphonic acid with beta naphthol (Lithol red, Colour Index No. 189)
2. Diazotized para-nitraniline ortho-sulphonic acid with beta naphthol (Lake red P, Colour Index No. 158)
3. Diazotized 2-naphthylamine 1-sulphonic acid with salicylic acid
4. Diazotized para-toluidine meta-sulphonic acid with the anilide of beta-oxynaphthoic acid.

*Mono-azo monocarboxylic acids.*—The carboxylic acid group may be in either component and the component not containing the carboxylic group may or may not contain a sulphonic acid group. These toners are more or less soluble as their free acids or alkali metal salts and are rendered insoluble by treatment with an alkaline earth or heavy metal salt. For example, such toners can be formed by coupling 1. Diazotized para-toluidine meta-sulphonic acid with beta-oxynaphthoic acid (Lithol Rubine, Colour Index No. 163)
2. Diazotized para-nitro ortho-toluidine with beta-oxynaphthoic acid
3. Diazotized anthranilic acid with beta naphthol (Lake red D, Colour Index No. 214)
4. Diazotized 2-naphthylamine 1-sulphonic acid with beta-oxynaphthoic acid (Lake Bordeaux B, Colour Index No. 190).

*Azo pigment dyestuffs.*—This type of toner is a substantially insoluble dyestuff produced in the coupling itself and does not contain salt-forming groups. The following illustrative cases are formed by coupling 1. Diazotized para-nitro-aniline with beta naphthol (Para red, Colour Index No. 44)
2. Diazotized meta-nitro para-toluidine with aceto-acetanilide (Hansa yellow G)
3. Diazotized para-nitro ortho-toluidine with beta naphthol (Pigment orange R, Colour Index No. 68)
4. Diazotized alpha-naphthylamine with beta naphthol (Autol red RL, Colour Index No. 82).

For convenience's sake and to conform with commercial and industrial practice the term beta-oxynaphthoic acid is used herein to designate the 2.hydroxynaphthalene-3.carboxylic acid.

For the purpose of this invention and in accordance with commercial practice, a "toner" is defined as an organic pigment which may or may not contain salt-forming groups and which is not associated with a substratum or extender; and a "lake" is an organic pigment which contains a substratum or extender. In the former type of pigment the true coloring matter is produced directly in an insoluble form and can be used for various purposes as such, without the addition of a substratum; in the latter type the true coloring matter is associated intimately with a substratum, which is commonly an inorganic substance, such as alumina hydrate, blanc fixe, etc. or combinations of the same.

The choice between the two types of pigments depends largely upon the intended use, there being various essential differences in their properties, which relate to texture, dispersion, oil absorption, bulking value, and behavior in vehicles. These differences are best explained by the following illustrations.

The alkaline earth salt of the dyestuff prepared by coupling diazotized para-toluidine metasulphonic acid with beta oxynaphthoic acid may be used as such (toner form) or may be extended with a substratum consisting of alumina hydrate and blanc fixe (lake form). For use as a rubber pigment it has been found that the lake form has definite advantages over the toner in respect to (a) greater strength for the same dyestuff content, (b) reduction of the tendency to crock, and (c) blending with other pigments. Similarly, in the application of pigments to linoleum the lake or extended type of pigment has a definite advantage because of ease of dispersion. In paints and enamels, toners are generally used for their advantages in such properties as gloss; however, in the case of the cheap Para reds (so-called grinder's reds) a substratum is an aid in the grinding of the paint. In the field of printing inks, the lake form of pigment may offer an advantage over the toner form under certain conditions where texture is an important problem. On the other hand, toners show advantages from the point of view of allowing the ink-maker greater freedom in the choice of white base (extender) which he grinds into the ink; however, under certain conditions the combination of toner and white pigment ordinarily used in the ink might be replaced by a lake color which would result in simplification in the manufacture of the ink.

The present invention relates to the lakes which contain a substratum, and they can be obtained from the toner type of azo compounds as well as from the azo compounds which only by association with a substratum become a pigment, or lake, in both instances the azo compound is substantially water insoluble before developing or becomes so during development.

The products of the present invention combine to a certain extent the color strength and properties of a toner with the properties usually found in a lake formed with an inorganic substratum.

The improvement in our novel lakes or pigments over products containing mineral substrata only is apparent when using relatively small amounts, say from 5% up, of a petroleum sulphonate in the development. With amounts up to for instance 20% of the finished lake there is in some instances, no noticeable dilution or weakening of the strength of the products while with larger amounts such a dilution is evident.

Our novel lakes and pigments are characterized chemically by containing as the substratum a sulphonated petroleum compound. They have brighter and cleaner shades and improved tinctorial properties over lakes and pigments made with inorganic substrata.

The following are examples of how we prepare novel lakes and pigments according to our invention.

It will be understood that our invention is not limited to the particular azo compounds described therein nor to the specific manipulation steps described. Similar results are also obtained with other azo compounds which are capable of forming lakes and pigments on development with a substratum and similar results are also obtained by using in the development other alkaline earth metal and heavy metal salts of the azo compound and the sulphonated petroleum.

*Example I.*—A solution of 41.8 parts of the sodium salt of paratoluidine metasulphonic acid ($CH_3:SO_3:NH_2 = 1:3:4$) is diazotized with 14.4 parts of nitrite of soda and 52 parts of 20° Bé. muriatic acid.

40 parts of beta oxynaphthoic acid (OH:COOH=2:3) are dissolved in a solution of 16.3 parts of caustic soda and 200 parts of water. To this are added 40.3 parts of soda ash in 400 parts of water. The temperature and volume of the beta oxynaphthoic acid solution is adjusted to 40° C. and 1000 parts of solution, and the above described diazo preparation is then run in whereupon the azo coupling proceeds quickly and to good completion. After stirring a short time the dyestuff is filtered.

The soda salt dye paste is then re-slurried to 16,800 parts of water at 40° C. To this are added 9.6 parts of para soap in 50 parts of water. In a separate container 32 parts of sulphonated petroleum oil are added to a solution of 6.5 parts of caustic soda in 400 parts of water, and the solution boiled. This sulphonated petroleum oil soap solution is then added to the dye solution and the temperature adjusted to 40° C. and stirred 15 minutes.

In a separate container 80 parts of calcium chloride are dissolved in 2000 parts of water and the temperature adjusted to 27° C. and into this is then run in 10 minutes the dye soap solution. There is then added 41 parts of caustic soda in 500 parts of water and the slurry stirred for 15 minutes. The charge is then heated to the boil and digested at this temperature for ½ hour, after which it is washed, filtered, and dried in the usual manner.

The yield is approximately 124 parts of pigment compared with 92 parts in a charge carried out in exactly the same way, but without the sulphonated petroleum oil. The lake pigment contains about 26% of petroleum calcium sulphonate, and when ground in litho varnish prints with a bright, clean tone.

*Example II.*—A mixture of 76 parts of metanitro-para-toluidine and 825 parts of water is pulped until a creamy paste is obtained. This paste is diazotized with 38 parts of sodium nitrite and 54 parts of muriatic acid (100%) in the usual manner and the diazo preparation is allowed to stir for 1½ hours.

In a separate container a solution of 79 parts of beta naphthol and 24 parts of caustic soda is prepared and made to a volume corresponding to approximately 2500 parts of solution at 38° C. To this is added a mixture of 4.7 parts of para soap in 60 parts of water, a solution of 85 parts of sodium acetate in 500 parts of water, a solution of 56 parts of sodium bicarbonate in 625 parts of water, and finally, a solution made by boiling 25 parts of petroleum sulphonate in a solution of 1 part of caustic soda and 375 parts of water until saponification is complete. The resulting solution is adjusted to 5600 parts of solution at 35° C. and the above diazo preparation is added in 1 hour, the azo coupling proceeds rapidly to completion. The dyestuff is stirred for 15 minutes, and then the slurry is struck with a solution of 13 parts of calcium chloride in 625 parts of water and the stirring continued for an additional 15 minutes. The product is then washed, filtered, and dried in the usual manner.

The yield is approximately 180 parts of pigment compared to 135 parts in a charge prepared without the petroleum sulphonate. The pigment contains about 14% of petroleum calcium sulphonate. The tinctorial properties are those of a lake of good strength.

*Example III.*—A mixture of 100 parts of the sodium salt of the dyestuff 6-sulpho 4-chloro 3-toluene azo beta naphthol is pulped until a creamy paste is obtained with 1000 parts of water. The volume and temperature of the dyestuff slurry is then adjusted to 6000 parts of suspension at 25° C. In a separate container 18 parts of petroleum sulphonate are dissolved in 400 parts of hot water; this solution is then added to a boiling solution of 12 parts of calcium chloride in 1200 parts of water and boiled to complete the formation of the metallic soap. The petroleum calcium sulphonate is then added to the above dyestuff slurry and stirred until a thorough mixture is obtained. A solution of 8 parts of boric acid in 160 parts of water is then added. After stirring a short time the dyestuff slurry is brought to 90° C. and the volume adjusted to 10,000 parts of suspension, it is then slowly added to a solution of 100 parts of barium chloride in 4000 parts of water at 90° C., and after being quickly brought to the boil, boiled 15 minutes to insure completion of its development, after which it is washed, filtered, and dried in the usual manner.

The yield is approximately 128 parts of dry product compared to 113 parts in a charge carried out in exactly the same way but without any petroleum sulphonate. The lake pigment contains about 12% of petroleum calcium sulphonate, and possesses the usual properties of a lake.

We claim:

1. In a process of preparing azo lakes and pigments the step of developing an aqueous suspension of an azo coloring compound and an insoluble salt of a sulphonated petroleum.

2. In a process of preparing azo lakes and pigments the step of developing by heating an alkaline, aqueous suspension of an insoluble azo coloring compound and an insoluble petroleum sulphonate.

3. A lake or pigment comprising an azo coloring compound combined with a substratum comprising an insoluble salt of a petroleum sulphonate.

4. A lake or pigment comprising a water insoluble azo coloring compound combined with a substratum comprising a water insoluble petroleum sulphonate.

5. A lake or pigment comprising an alkaline earth metal salt of the azo compound obtained by coupling diazotized paratoluidine metasulphonic acid with betaoxynaphthoic acid combined with a substratum comprising an alkaline earth metal petroleum sulphonate.

6. A lake or pigment comprising the azo compound obtained by coupling diazotized metanitro-paratoluidine with beta naphthol combined with a substratum comprising an alkaline earth metal salt of a petroleum sulphonate.

7. A lake or pigment comprising an alkaline earth metal salt of the dyestuff obtained by coupling diazotized 4-chloro-3-toluidine-6-sulphonic acid with beta naphthol combined with a substratum comprising an alkaline earth metal petroleum sulphonate.

ARCHIBALD M. ERSKINE.
ALFRED SIEGEL.